No. 783,631. PATENTED FEB. 28, 1905.
W. GREGER.
CABLE CLIP.
APPLICATION FILED MAR. 3, 1904.
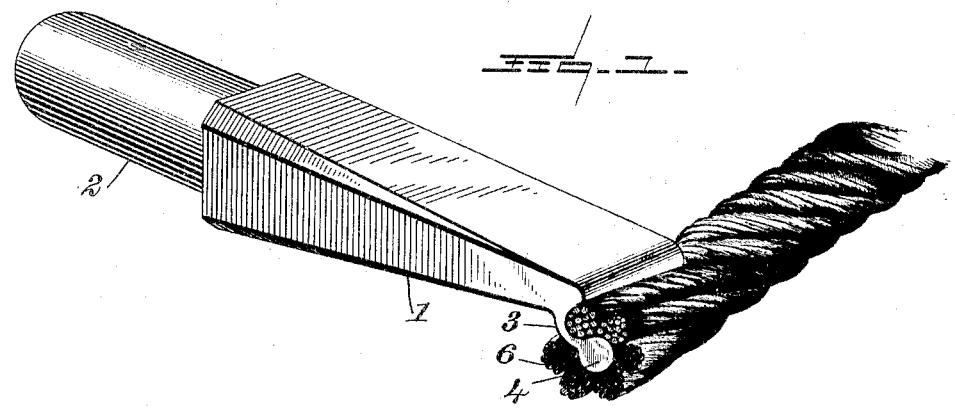
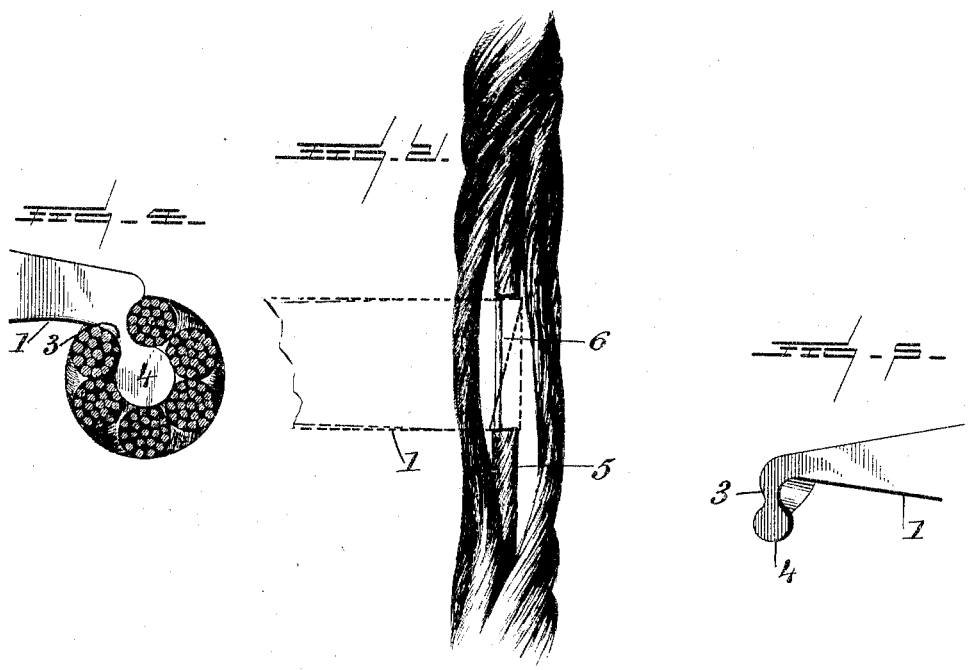
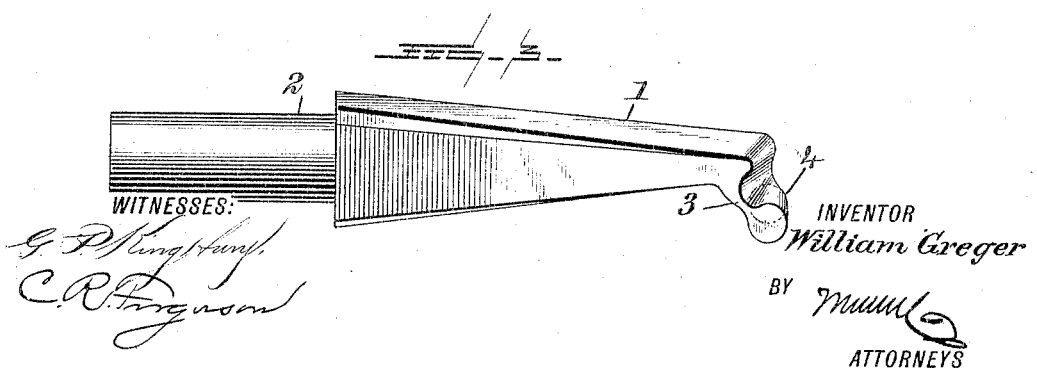
WITNESSES:
INVENTOR
William Greger
BY
ATTORNEYS No. 783,631. Patented February 28, 1905.

UNITED STATES PATENT OFFICE.

WILLIAM GREGER, OF BARRON, WASHINGTON.

CABLE-CLIP.

SPECIFICATION forming part of Letters Patent No. 783,631, dated February 28, 1905.

Application filed March 3, 1904. Serial No. 196,257.

*To all whom it may concern:*

Be it known that I, WILLIAM GREGER, a citizen of the United States, and a resident of Barron, in the county of Whatcom and State of Washington, have invented a new and Improved Cable-Clip, of which the following is a full, clear, and exact description.

This invention relates to improvements in clips designed for engaging with a wire cable, an object being to provide a clip that will overcome the strain and adapted to pass over deep-flanged sheaves and also so constructed as to pass freely around the large grip-pulley and under the holddown-sheaves.

I will describe a cable-clip embodying my invention and then point out the novel features in the appended claim.

Reference is to be had to the accompanying drawings, forming a part of this specification, in which similar characters of reference indicate corresponding parts in all the figures.

Figure 1 is a perspective view of a clip embodying my invention and showing the same in connection with a cable. Fig. 2 is a plan view illustrating the means of making the connection between the clip and cable. Fig. 3 is a perspective view of the clip, and Figs. 4 and 5 are opposite side views thereof.

Referring to the drawings, 1 designates the shank portion of the clip, having a spindle 2 at one end for engagement with a part to be drawn along. The upper and lower surfaces or sides of the shank 1 are convergent from the spindle portion 2—that is, the device is substantially wedge-shaped. At its end opposite the spindle 2 it has a turndown portion 3, which is concaved on its outer side and convexed on its inner side, and this turned-down portion 3 terminates in a head 4, which is round in cross-section and approximates the size of the core of the cable with which the device is to be engaged. The head 4 extends entirely across the turned-down portion and terminates at the side of said portion, so that there are no projections liable to break or bend in making sharp turns, and thus weaken the cable.

It will be noted that the part 3, turned at an angle to the shank, and the head 4 thereon are placed at an obtuse angle with relation to the width of the shank. In applying the clip to a cable the twist of the cable is to be loosened, so that the head and the portion 3 may be passed downward between two strands of the cable—that is, passed into the cable from the top and wholly within the cable. A portion of the core 5 of the cable is to be removed, excepting one strand thereof, as indicated at 6. The portion of the core removed will be just wide enough to receive the head of the clip. The upper strand of the cable, as clearly indicated in Fig. 1, fits into the concavity of the portion 3, and the angular relation of the portion 3 and the head with the shank corresponds to the spiral trend of the cable-strands.

It will be noted that the portion 3 is of a sufficient length to permit the head to be inserted from the top of a cable, whereby the shank of the device is arranged above the longitudinal center of the cable, so that it will not engage with the flange of a sheave and lift the cable out of engagement with the sheave.

Having thus described my invention, I claim as new and desire to secure by Letters Patent—

A cable-clip comprising a shank having a downwardly-turned end portion terminating in a head approximating the size of a cable-core, the ends of said head terminating at the sides of said turned-down portion, the angle of said turned-down portion having such relation to the shank that said portion and the head may be inserted wholly within the cable from the upper portion thereof, thus holding the shank above the longitudinal center of the cable.

In testimony whereof I have signed my name to this specification in the presence of two subscribing witnesses.

WILLIAM GREGER.

Witnesses:
    EDWARD WILLIAM FORBES,
    WILLIAM R. LAMONT.